(12) United States Patent
Watson

(10) Patent No.: US 8,714,575 B2
(45) Date of Patent: May 6, 2014

(54) AUTOMATED RETRACTABLE RUNNING BOARD

(75) Inventor: Bradley E. Watson, Barrie (CA)

(73) Assignee: Magna International Inc, Aurora, Ontario (CA)

( * ) Notice: Subject to any disclaimer, the term of this patent is extended or adjusted under 35 U.S.C. 154(b) by 164 days.

(21) Appl. No.: 12/866,903

(22) PCT Filed: Feb. 18, 2009

(86) PCT No.: PCT/CA2009/000203
§ 371 (c)(1),
(2), (4) Date: Aug. 10, 2010

(87) PCT Pub. No.: WO2009/103163
PCT Pub. Date: Aug. 27, 2009

(65) Prior Publication Data
US 2010/0320715 A1    Dec. 23, 2010

Related U.S. Application Data

(60) Provisional application No. 61/066,271, filed on Feb. 19, 2008.

(51) Int. Cl.
B60R 3/02    (2006.01)
(52) U.S. Cl.
USPC ........................................................ 280/166

(58) Field of Classification Search
USPC ........................................ 280/163, 164.1, 166
See application file for complete search history.

(56) References Cited

U.S. PATENT DOCUMENTS

| | | | | |
|---|---|---|---|---|
| 2,158,949 | A * | 5/1939 | Sarles et al. | .................... 182/91 |
| 4,116,457 | A | 9/1978 | Nerem et al. | |
| 5,228,707 | A * | 7/1993 | Yoder | ........................... 280/166 |
| 5,358,268 | A | 10/1994 | Hawkins | |
| 2004/0108678 | A1* | 6/2004 | Berkebile et al. | ............. 280/166 |
| 2004/0174043 | A1 | 9/2004 | Bradsen et al. | |
| 2006/0214386 | A1 | 9/2006 | Watson | |
| 2006/0245883 | A1* | 11/2006 | Fontaine et al. | ............. 414/537 |
| 2008/0179920 | A1 | 7/2008 | Watson | |
| 2009/0184486 | A1* | 7/2009 | Kircher | ........................ 280/166 |

* cited by examiner

Primary Examiner — Frank Vanaman
(74) Attorney, Agent, or Firm — Miller Canfield

(57) ABSTRACT

A running board assembly is provided for a motor vehicle. The running board assembly includes an actuator housing fixedly mounted to the motor vehicle. An arm is slidable relative to the actuator housing in opposing inboard and outboard directions for movement into and out of the actuator housing. A linear mechanism is disposed within the actuator housing and is spaced apart from the arm. The linear mechanism is also operably connected to the arm to provide linear movement of the arm in the inboard and outboard directions. A step is pivotal relative to the arm and movable in the opposing inboard and outboard directions therewith for movement between a stowed position and a deployed position.

11 Claims, 16 Drawing Sheets

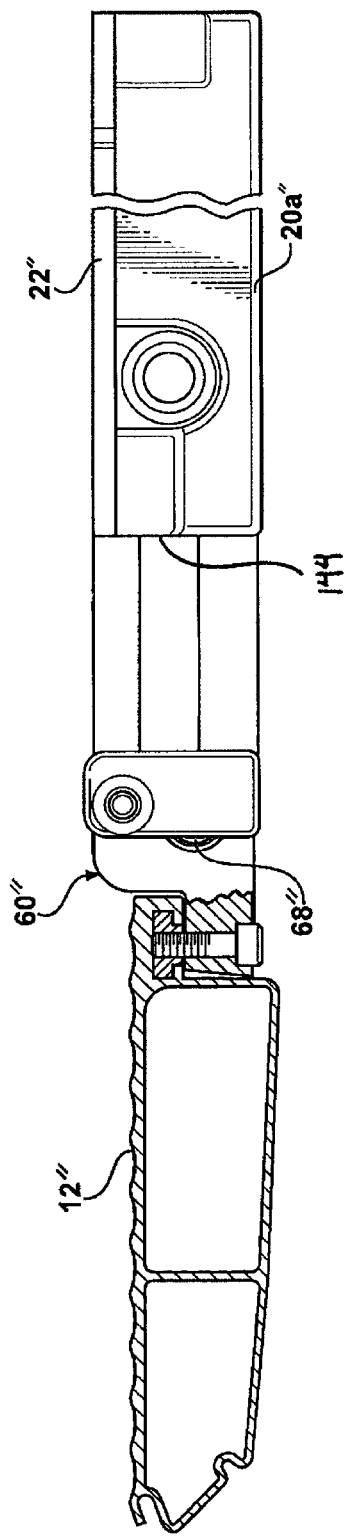

AUTOMATED RETRACTABLE RUNNING BOARD

CROSS-REFERENCE TO RELATED APPLICATIONS

This application is a national phase application and claims priority to and all the benefits of, under 35 USC 371, of PCT/CA2009/00203, filed on Feb. 18, 2009, which in turn claims the priority of U.S. Provisional Application No. 61/066,271, filed on Feb. 19, 2008and entitled "Automated Retractable Running Board". All applications are incorporated herein by reference in their entireties.

BACKGROUND

1. Field of Invention

The invention relates to running boards for motor vehicles. More particularly, the invention relates to a running board assembly including a step movable between a stowed position and a deployed position.

2. Description of Related Art

Retractable running boards or steps are well-known in the art for allowing users to enter and exit a motor vehicle having a high ground clearance. These so-called retractable running boards or steps are generally movable between a retracted position, in which a step is tucked underneath an underbody of the motor vehicle, and an extended position, in which the step is spaced apart from the underbody of the motor vehicle for supporting the user.

SUMMARY

According to one aspect of the invention, a running board assembly for a motor vehicle includes a step, a pivot assembly fixedly secured to the step, an arm coupled to the pivot assembly, and a linear mechanism coupled to the arm and spaced apart therefrom to impart linear movement to the arm in opposing outboard and inboard directions, whereby the pivot assembly is pivotal relative to the arm to tilt the step relative thereto before or after travel of the arm in the opposing outboard and inboard directions.

According to another aspect of the invention, a running board assembly for a motor vehicle includes an actuator housing fixedly mounted to the motor vehicle, an arm slidable relative to the actuator housing in opposing inboard and outboard directions for movement into and out of the actuator housing, a linear mechanism disposed within the actuator housing and spaced apart from the arm, the linear mechanism operably connected to the arm to provide linear movement of the arm in the inboard and outboard directions, and a step pivotal relative to the arm and movable in the opposing inboard and outboard directions therewith for movement between a stowed position and a deployed position.

According to yet another aspect of the invention, a running board assembly for a motor vehicle includes an actuator housing fixedly mounted to the motor vehicle and including an outer wall, an arm slidable relative to said actuator housing in opposing outboard and inboard directions for movement into and out of the actuator housing, a linear mechanism disposed within the actuator housing and operably coupled to the arm to move the arm in the opposing outboard and inboard directions; a pivot assembly coupled to the arm and pivotal relative thereto, the pivot assembly including an inboard surface and at least one bumper mounted therealong; and a step fixedly secured to the pivot assembly and movable between a stowed position, in which the arm is disposed inside the actuator housing and the at least one bumper abuts the outer wall thereof to maintain the step in an upwardly tilted orientation, and a deployed position, in which the arm is displaced out of the actuator housing in the outboard direction and the at least one bumper is spaced apart from the outer wall such that the step tilts to an orientation level with the ground.

According to still another aspect of the invention, a method is provided for tilting a step between an upwardly tilted orientation and an orientation generally level with the ground. The method utilizes an actuator housing, an arm movable in outboard and inboard directions in to and out of the actuator housing, and a pivot assembly coupled to the arm and including at least one bumper disposed along an inboard surface. The method includes the steps of retaining the at least one bumper in abutting engagement with the actuator housing to retain the step in the upwardly tilted orientation, and displacing the arm in the outboard direction to release the at least one bumper from engagement with the actuator housing and to allow the step to tilt to the orientation generally level with the ground.

BRIEF DESCRIPTION OF THE DRAWINGS

The invention will be readily appreciated as the same becomes better understood by reference to the following detailed description when considered in connection with the accompanying drawings wherein:

FIG. 16 is an end view of the running board assembly including the step in the deployed position.

DETAILED DESCRIPTION OF THE EMBODIMENTS

Figure 1:
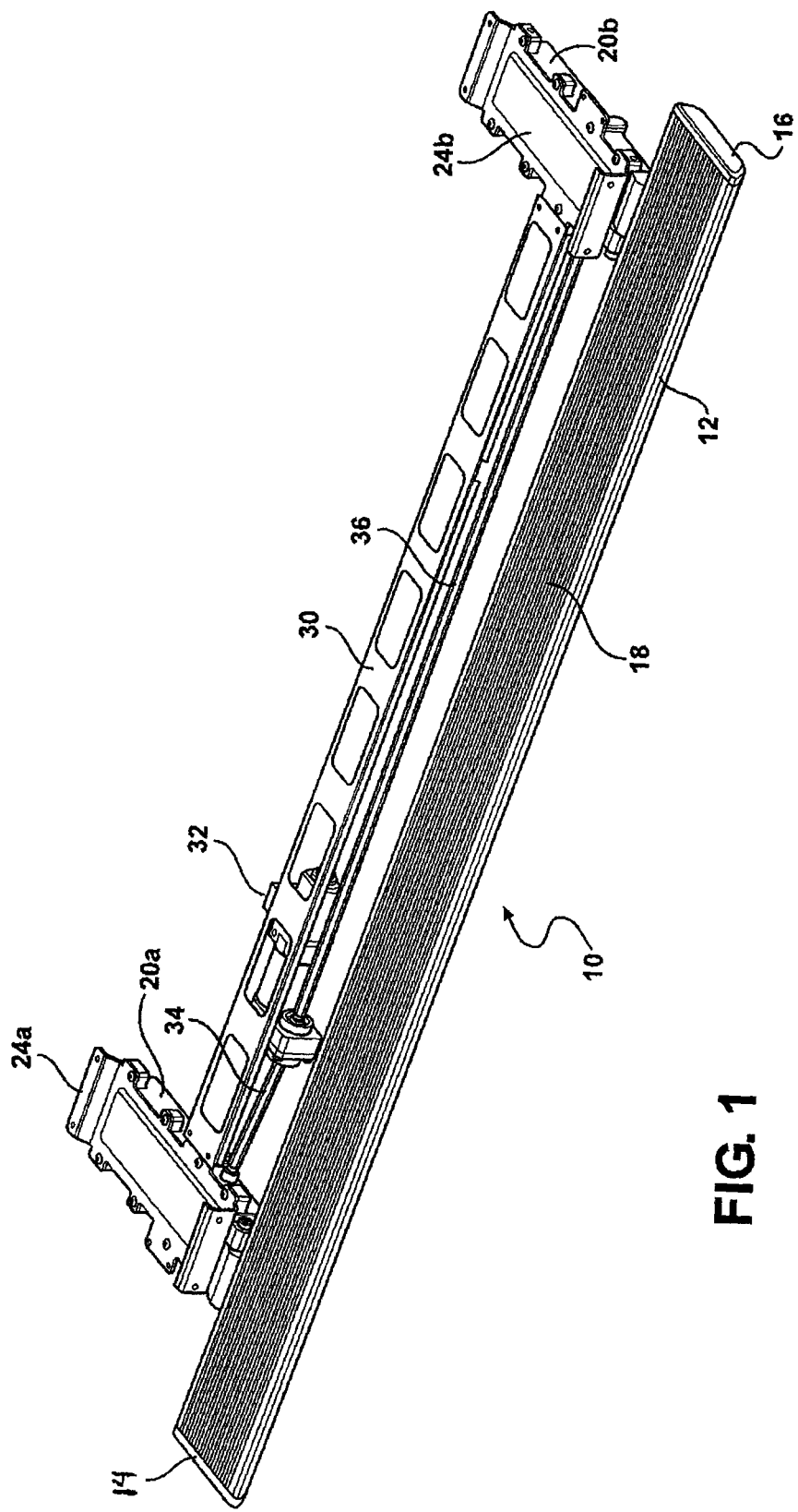
FIG. 1 is a top perspective view of a running board assembly according to one embodiment.
Figure 2:
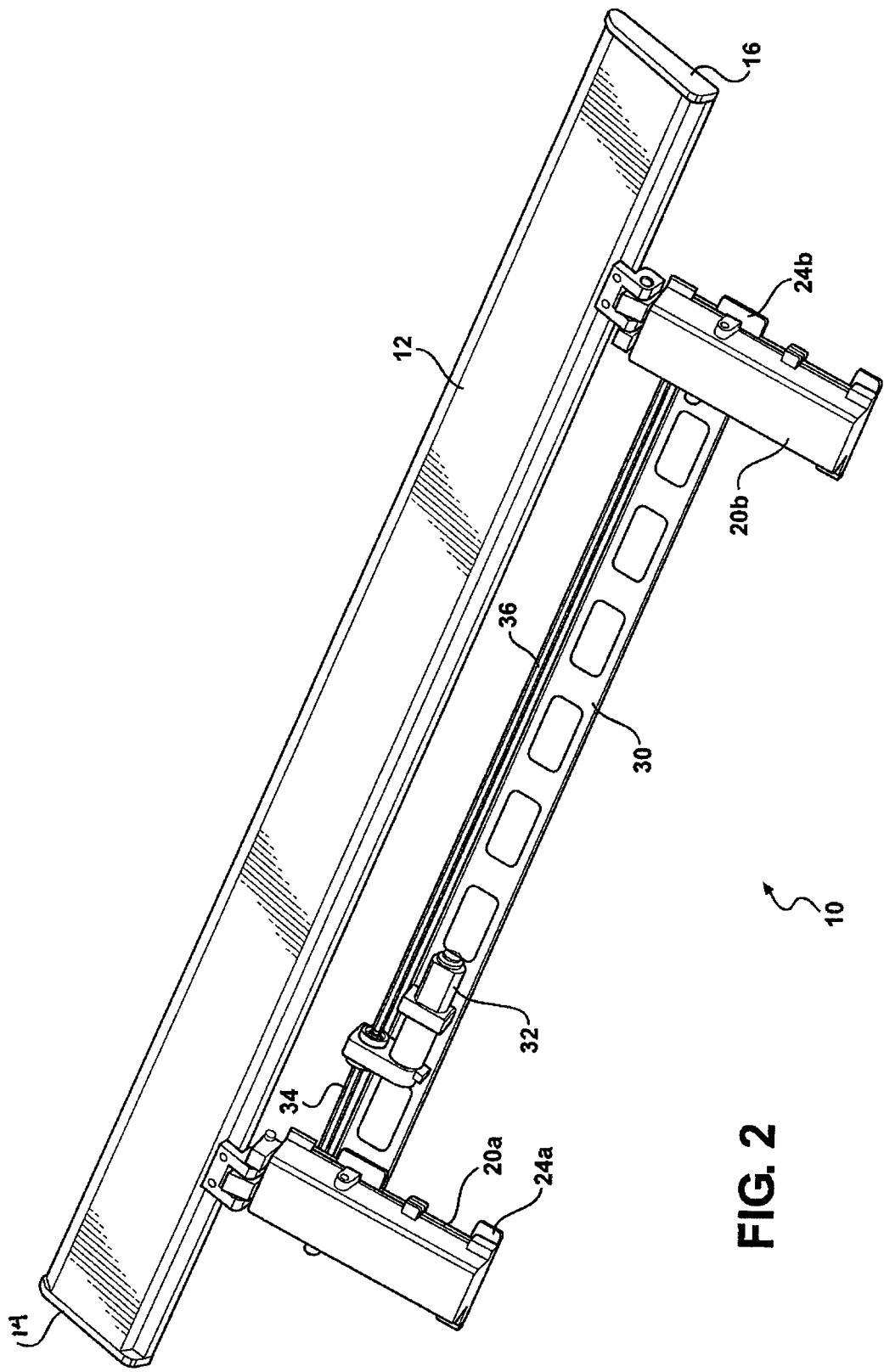
FIG. 2 is a bottom perspective view of the running board assembly.

Referring to FIGS. 1 and 2, a running board assembly, generally shown at 10, includes a step 12 for assisting individuals in entering and exiting a motor vehicle. The step 12 extends longitudinally between opposing end caps 14, 16. A step tread 18 extends in a longitudinal direction along both the step 12 and the end caps 14, 16.

The running board assembly 10 includes first 20a and second 20b actuator housings adapted to be fixedly secured to the motor vehicle. Although two actuator housings 20a, 20b are shown, it is appreciated that the particular number of actuator housings utilized in the running board assembly 10 may vary. First 24a and second 24b cover members are fixedly secured to the respective first 20a and second 20b actuator housings by a plurality of cover screws 28 to prevent the accumulation of dirt, moisture, and the like therewithin.

The running board assembly 10 includes a connector structure 30 extending longitudinally between the first 20a and second 20b actuator housings. A motor assembly 32 is fixedly mounted to and supported by the connector structure 30. The motor assembly 32 is operably connected to the step 12 for movement thereof between a stowed position and a deployed position. First 34 and second 36 drive shafts are coupled to the motor assembly 32 and rotate in opposing first and second directions in response to actuation thereof. The first drive shaft 34 extends from the motor assembly 32 to the first actuator housing 20a, and the second drive shaft 36 extends from the motor assembly 32 to the second actuator housing 20b. It is appreciated that the particular location of the motor assembly 32 along the connector structure 30 may vary in light of packaging considerations of different motor vehicles.

The detailed description as set forth below specifically refers to the mechanism within the first actuator housing 20a. It should be appreciated that although this paragraph and the remaining detailed description refer only to the first actuator housing 20a, the first drive shaft 34, and components associated therewith, the same applies equally to the second actuator housing 20b, the second drive shaft 36, and the components associated therewith.

Figure 3:
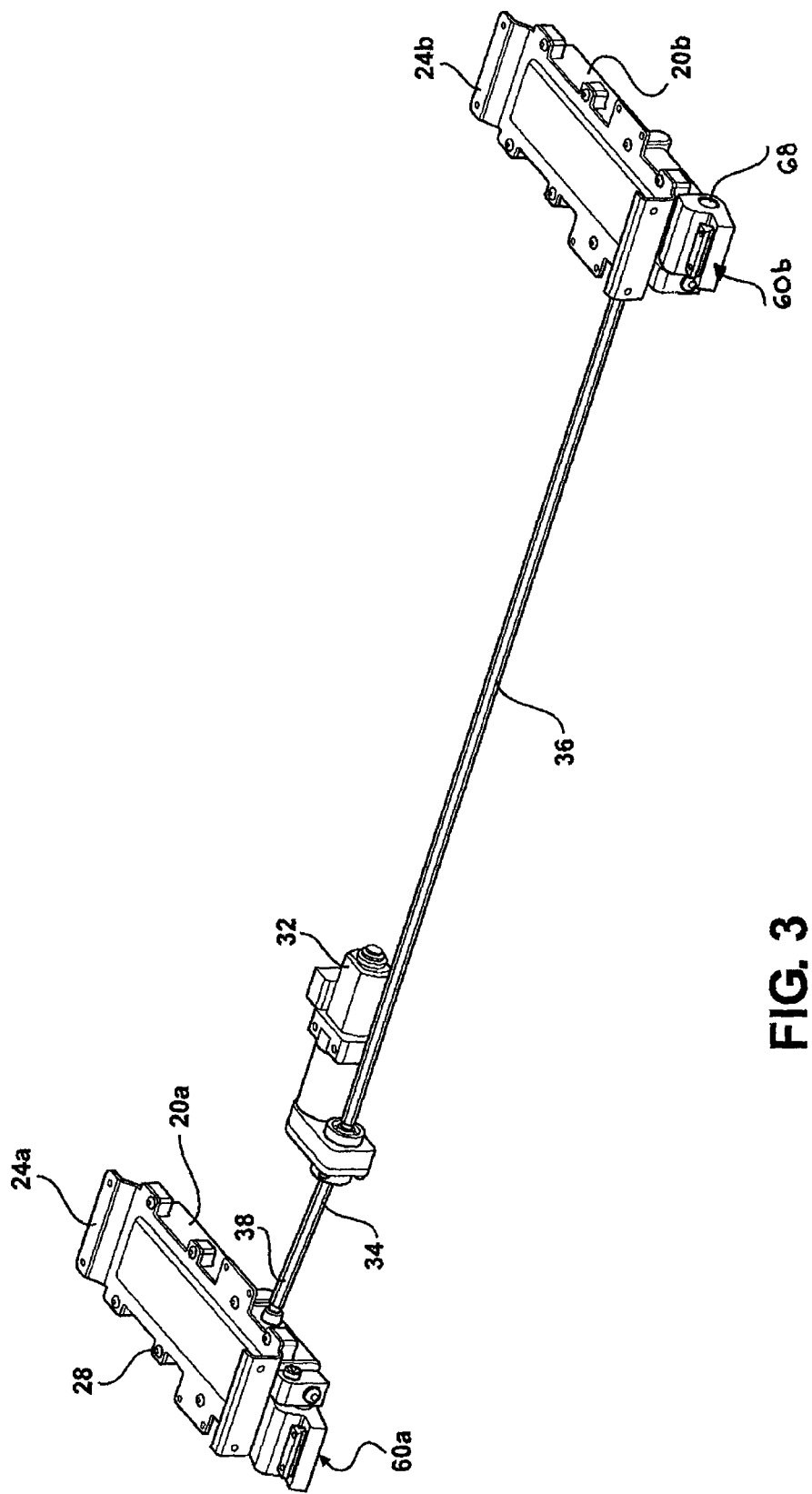
FIG. 3 is a perspective view of a motor assembly operably connected to first and second actuator housings by first and second drive shafts.
Figure 4:
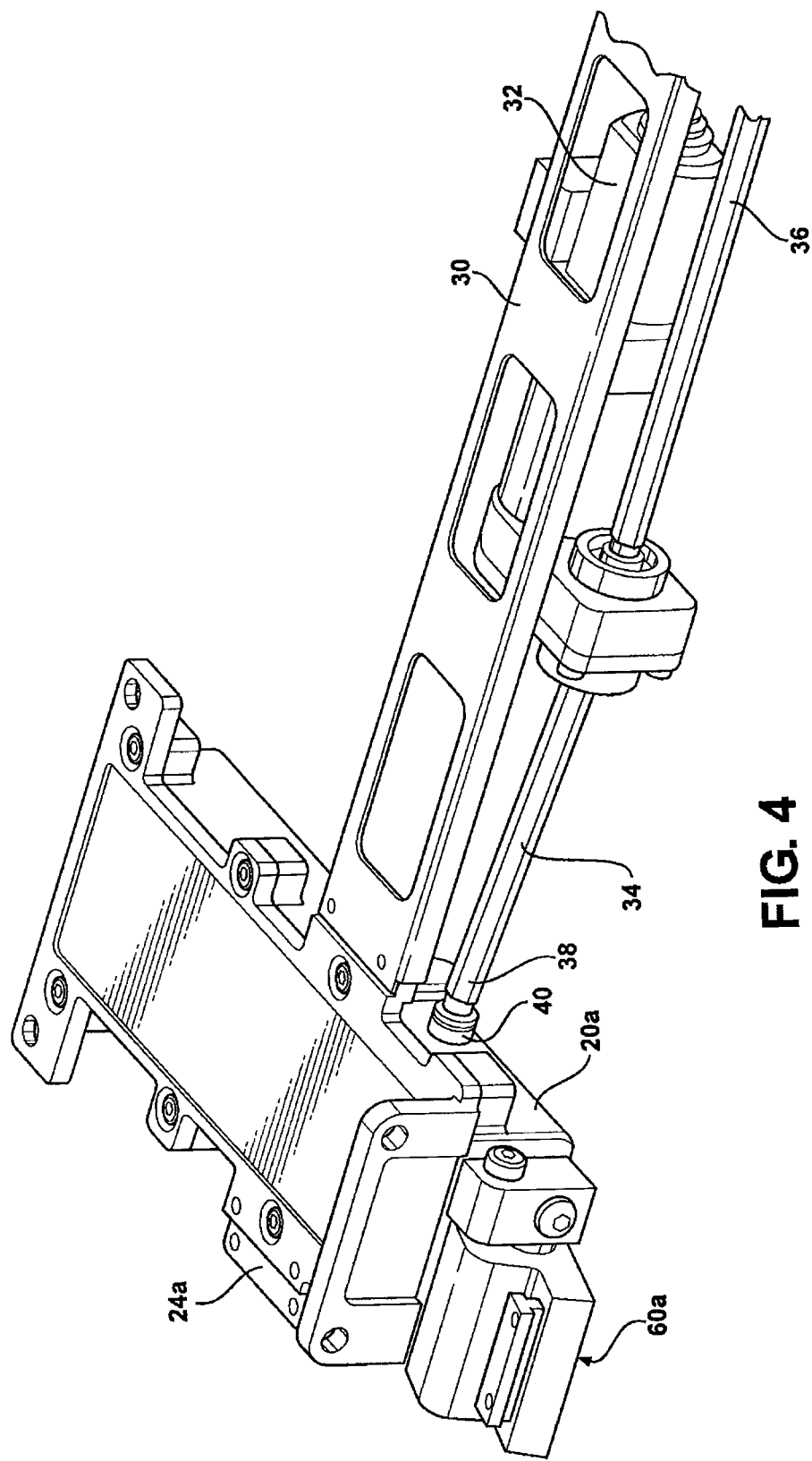
FIG. 4 is a fragmentary perspective view of the running board assembly including a first actuator housing, first and second drive shafts, and a pivot assembly.
Figure 5:
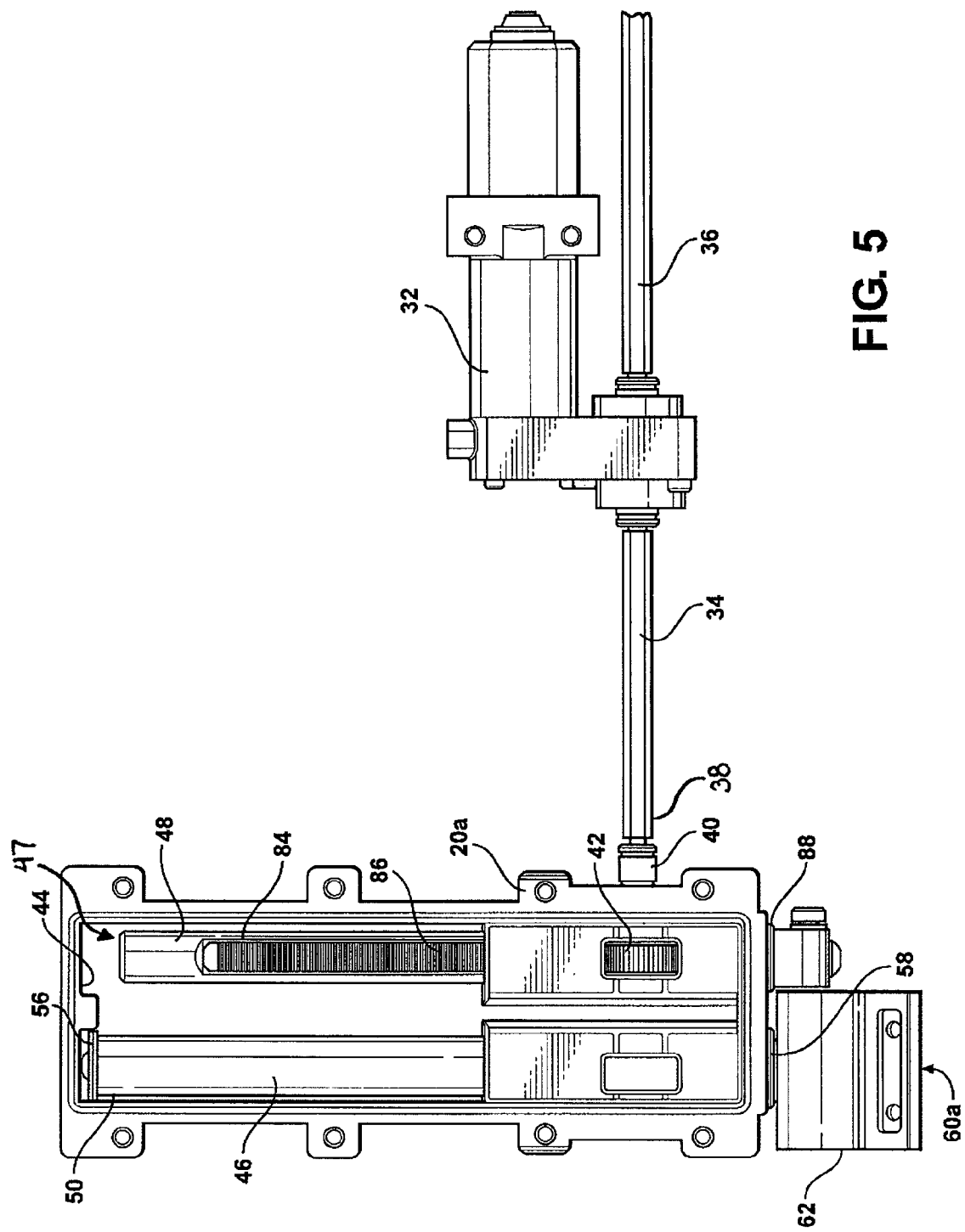
FIG. 5 is a top view of the running board assembly, partially cut away, including the first actuator housing, an arm and a deploy shaft received within the first actuator housing, the motor assembly, and the first and second drive shafts.

Referring to FIGS. 3 through 5, the first drive shaft 34 includes a distal end 38 fixedly secured to a shaft 40 extending out of the first actuator housing 20a. The shaft 40 includes a deploy gear 42 fixedly mounted therealong. Thus, rotation of the first drive shaft 34 will cause rotation of the deploy gear 42 via the shaft 40.

The first actuator housing 20a includes an interior portion 44 that houses an arm 46 and a linear mechanism 47, as shown in FIG. 5. It is appreciated that although the arm 46 and the linear mechanism 47 are shown in a side-by-side relationship, the particular configuration of the arm 46 and the linear mechanism 47 relative to one another may vary. In one embodiment, the linear mechanism 47 includes a deploy shaft 48. Both the arm 46 and the deploy shaft 48 move relative to the first actuator housing 20a in an outboard direction, shown by arrow A in FIG. 6, and an opposing inboard direction, shown by arrow B in FIG. 6. The arm 46 is in telescoping engagement with the first actuator housing 20a such that movement in the outboard direction moves the arm 46 out of the first actuator housing 20a and movement in the inboard direction moves the arm 46 into the first actuator housing 20a.

Figure 6:
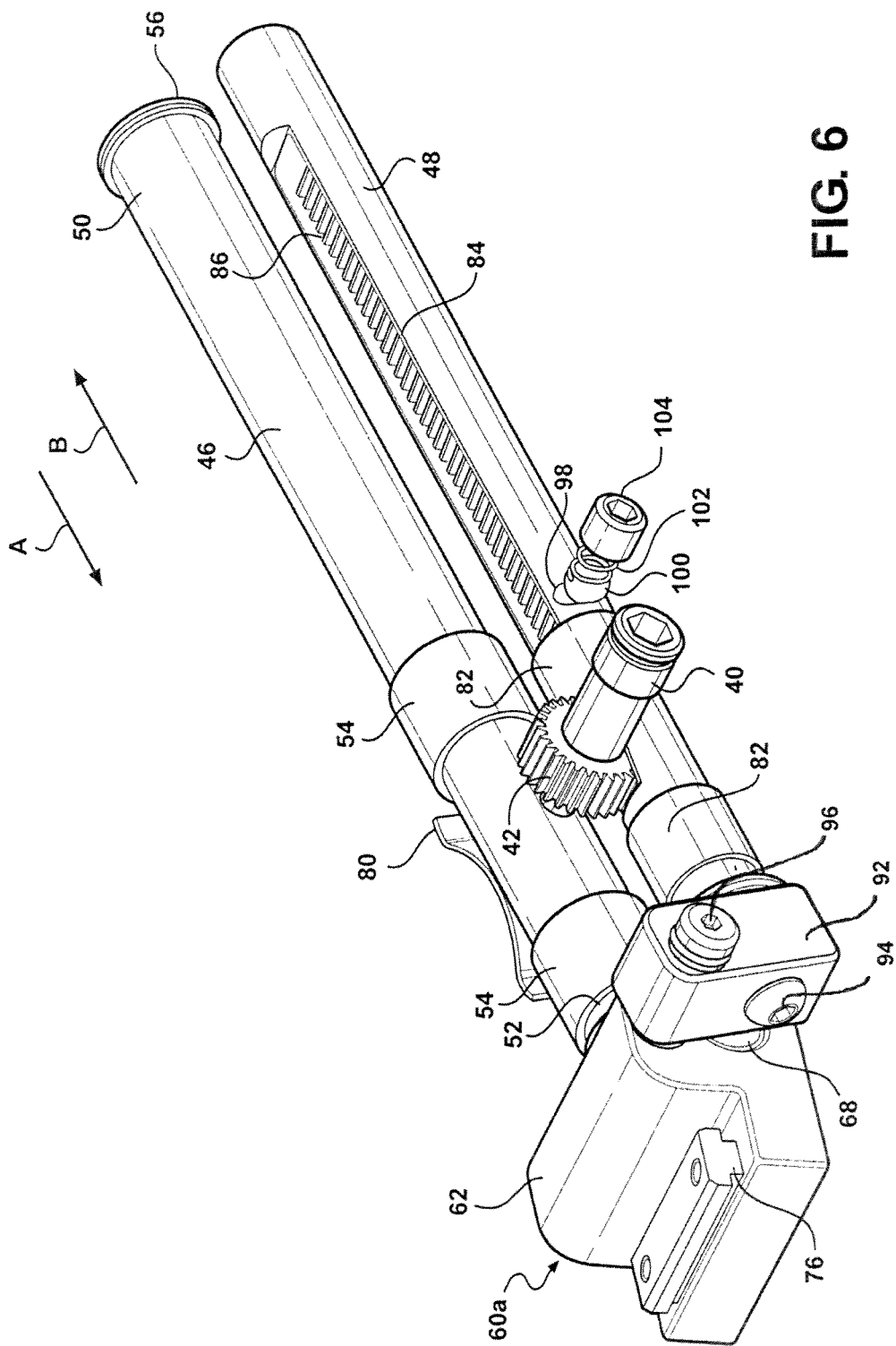
FIG. 6 is a perspective view of the deploy shaft and the arm coupled to the pivot assembly.
Figure 7:
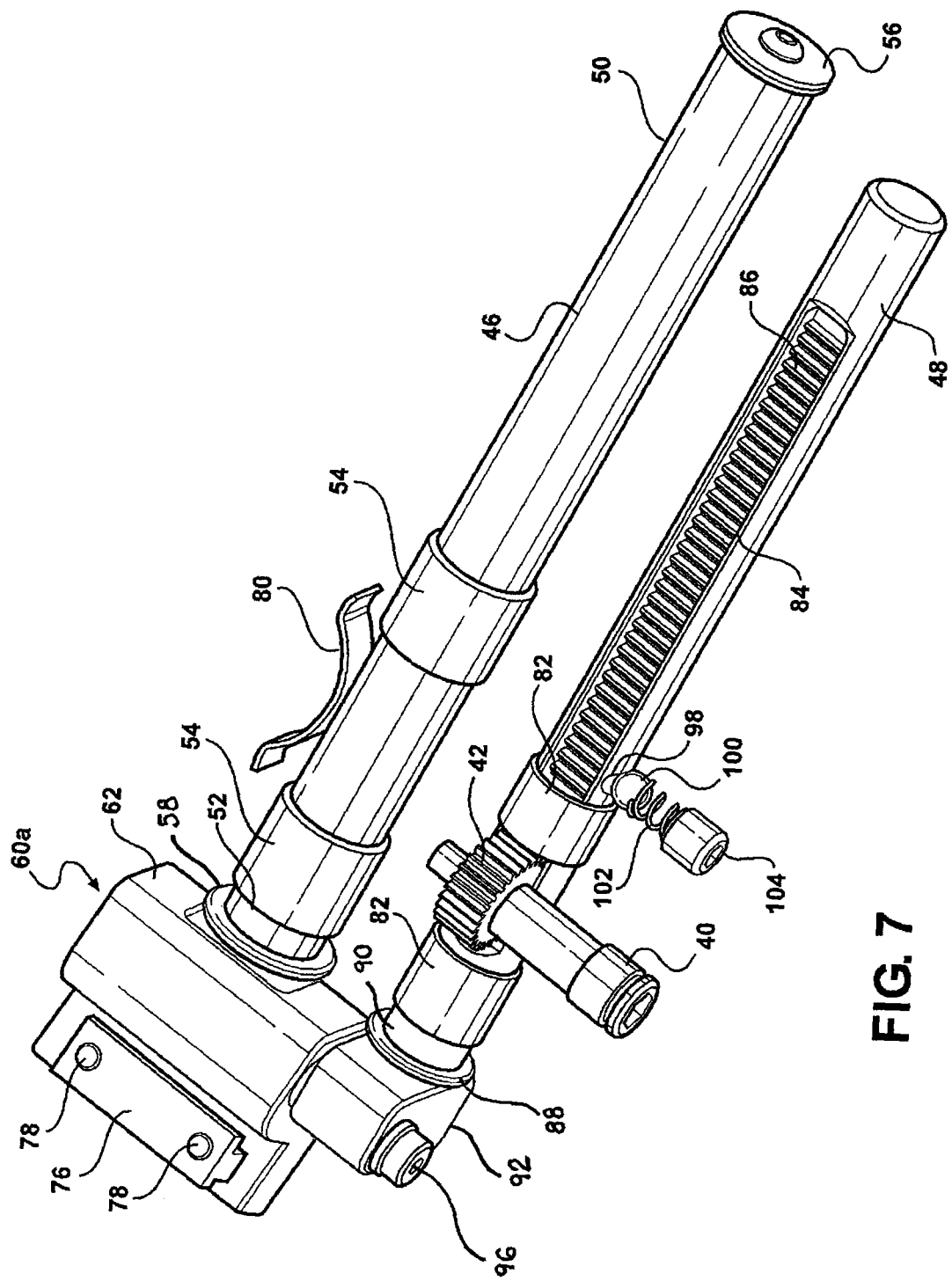
FIG. 7 is a top perspective view of the deploy shaft and the arm coupled to the pivot assembly.

Referring to FIGS. 6 and 7, the arm 46 extends between opposing inboard 50 and outboard 52 ends and is received within at least one bearing 54. A deploy limit stop 56 is located at the inboard end 50 of the arm 46. The deploy limit stop 56 bottoms out against the first actuator housing 20a to prevent further movement of the arm 46 in the outboard direction relative to the first actuator housing 20a. A stow stop 58 is located at the outboard end 52 of the arm 46. The stow stop 58 bottoms out against the first actuator housing 20a to prevent further movement of the arm 46 in the inboard direction relative to the first actuator housing 20a.

Figure 8:
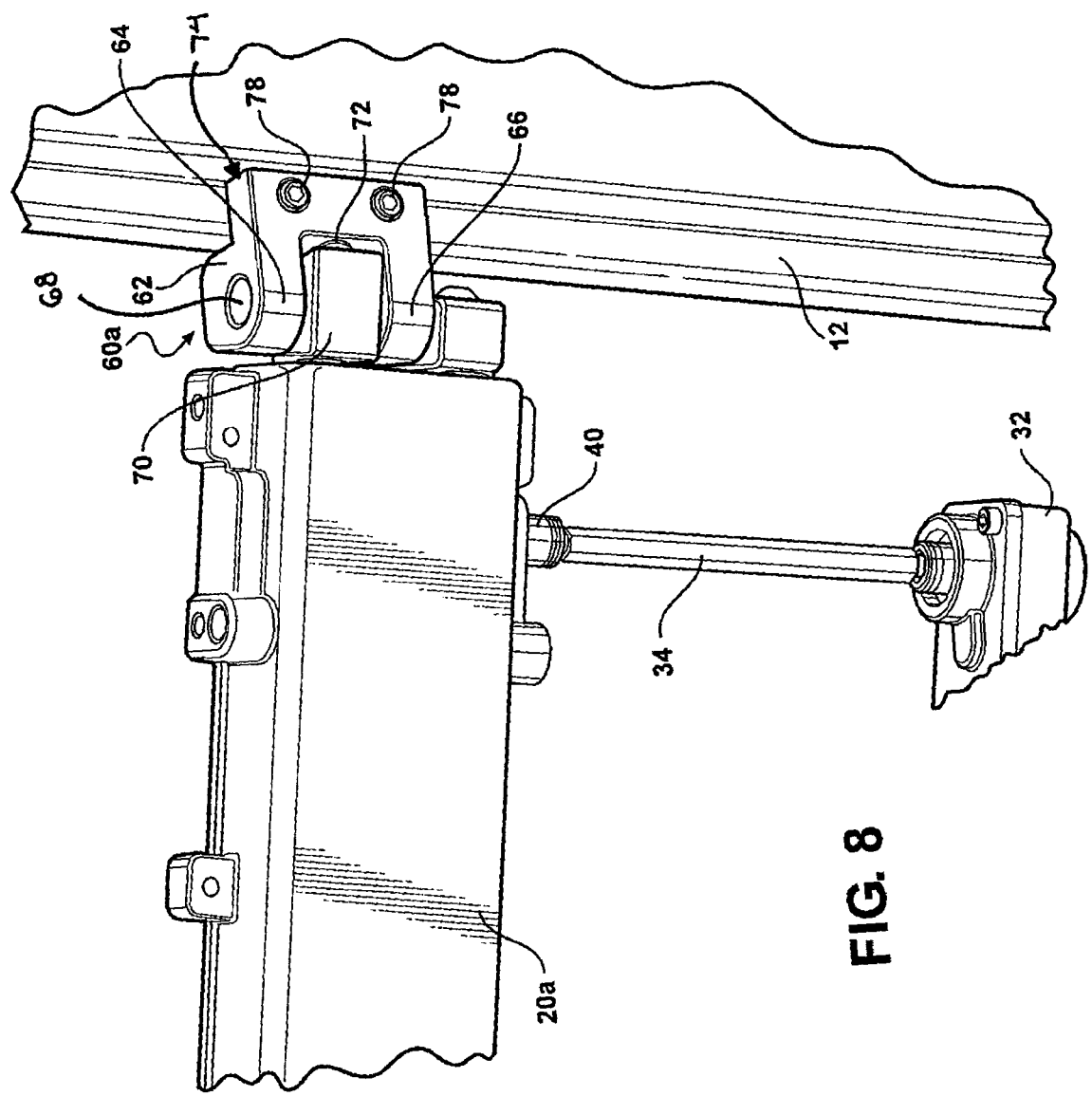
FIG. 8 is a bottom perspective view of the running board assembly including the pivot assembly disposed between the step and the first actuator housing.

Referring to FIGS. 6 through 8, a pivot assembly, generally indicated at 60a, is fixedly secured to the step 12 and is pivotal relative to the arm 46. The pivot assembly 60a includes a pivot bearing member 62 having a pair of spaced apart legs 64, 66 fixedly mounted along a pivot pin 68, as shown in FIG. 8. The pivot pin 68 extends through a protrusion 70 formed at the outboard end 52 of the arm 46 and rotates relative thereto. The rotation of the pivot pin 68 pivots the pivot bearing member 62 relative to the arm 46. The pivot assembly 60a also includes a mounting portion 74 having a nut 76 and screws 78 for fixedly securing the step 12 to the pivot assembly 60a. Thus, pivotal movement of the pivot assembly 60a relative to the arm 46 will pivot the step 12 relative thereto. A tilt limit stop 72 is disposed along the pivot assembly 60a to stop pivotal movement of the step 12.

A friction member 80 is disposed within the first actuator housing 20a and acts laterally upon the arm 46. In one embodiment, the friction member 80 is a leaf spring although it is appreciated that the particular friction member 80 may vary in another embodiment. The friction member 80 provides controlled rotation of the pivot assembly 60a and the step 12 with respect to the arm 46. The position of the friction member 80 between the first actuator housing 20a and the arm 46 rotates the step 12 via the pivot assembly 60a prior to linear movement of the arm 46. More specifically, the friction member 80 acts upon the arm 46 such that liner movement of the deploy shaft 48 cause the pivot assembly 60a and the step 12 to pivot relative to the arms 46 before the deploy shaft 48 cause liner movement of the arm 46.

Figure 9:
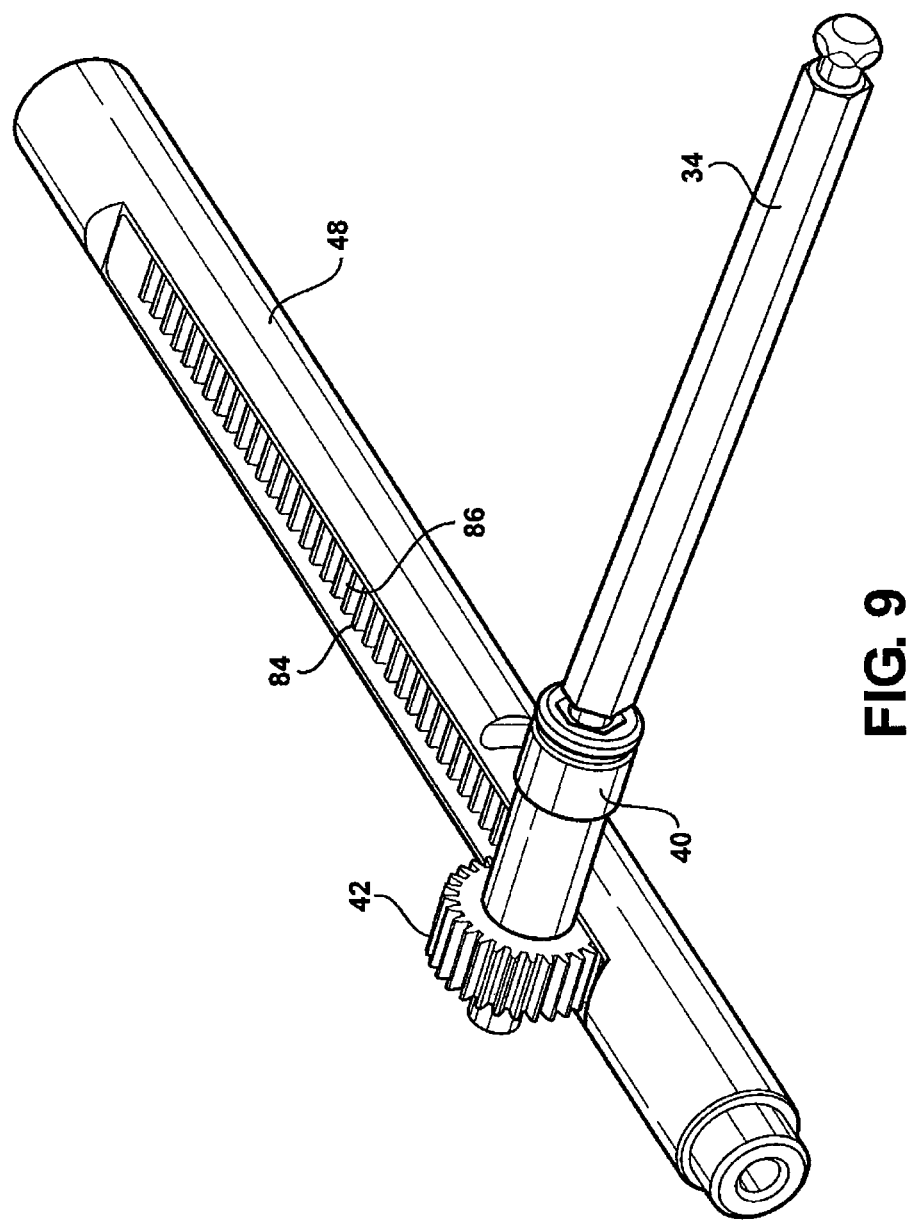
FIG. 9 is a perspective view of a deploy gear positioned along the deploy shaft and coupled to the drive shaft.

Referring to FIGS. 6, 7, and 9, the deploy shaft 48 extends through at least one bearing 82 and includes a linear rack 84 having a toothed portion 86. The deploy gear 42 engages the linear rack 84 such that rotation of the deploy gear 42 in a first direction initiates linear movement of the deploy shaft 48 in the outboard direction (see arrow A in FIG. 6) relative to the first actuator housing 20a to move the step 12 to the deployed position, and rotation of the deploy gear 42 in an opposing second direction causes linear movement of the deploy shaft 48 in the inboard direction (see arrow B in FIG. 6) relative to the first actuator housing 20a to move the step 12 to the stowed position. The deploy shaft 48 includes a stow stop 88 disposed at an outboard end 90. The stow stop 88 bottoms out against the first actuator housing 20a to stop movement of the deploy shaft 48 in the inboard direction as the step 12 reaches the stowed position. A tilt knuckle 92 is secured to the outboard end 90 of the deploy shaft 48 by a tilt screw 94. A tilt pin 96 extends through the tilt knuckle 92 and the pivot bearing member 62.

The deploy shaft 48 also includes a detent groove 98 formed along one side thereof. The detent groove 98 selectively receives a ball 100 therewithin. A spring 102 extends between the ball 100 and a plug 104 and biases the ball 100 into the detent groove 98. When the step 12 is moved to the stowed position such that the deploy shaft 48 is located inside the first actuator housing 20a, the spring 102 urges the ball 100 into the detent groove 98 to maintain the step 12 in the stowed position. When the step 12 is moved to the deployed position such that a portion of the deploy shaft 48 extends outside the first actuator housing 20a, the spring 102 allows the ball 100 to withdraw from the detent groove 98.

Figure 10:
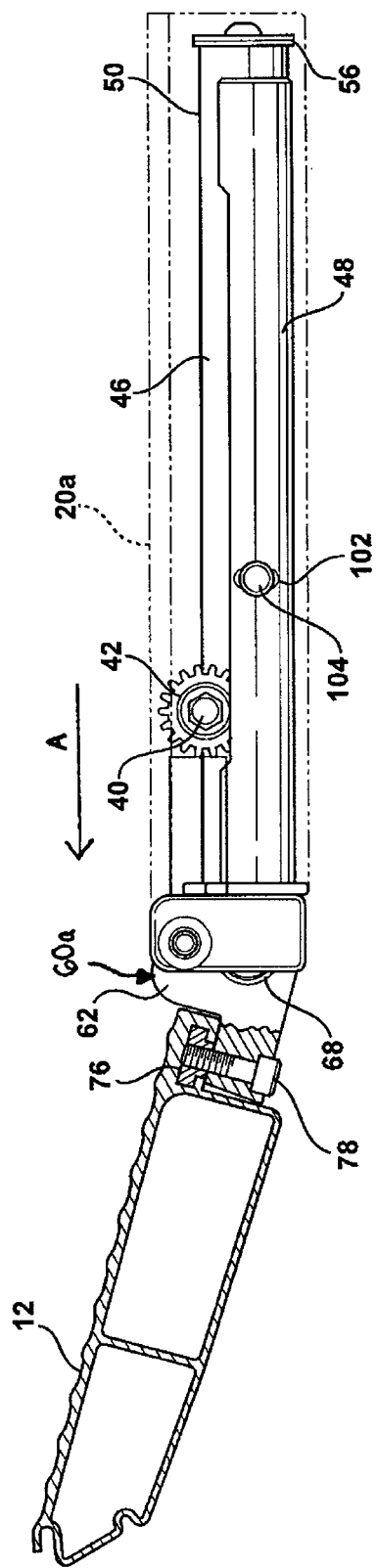
FIG. 10 is an end view of the running board assembly including the step in a stowed position.
Figure 11:
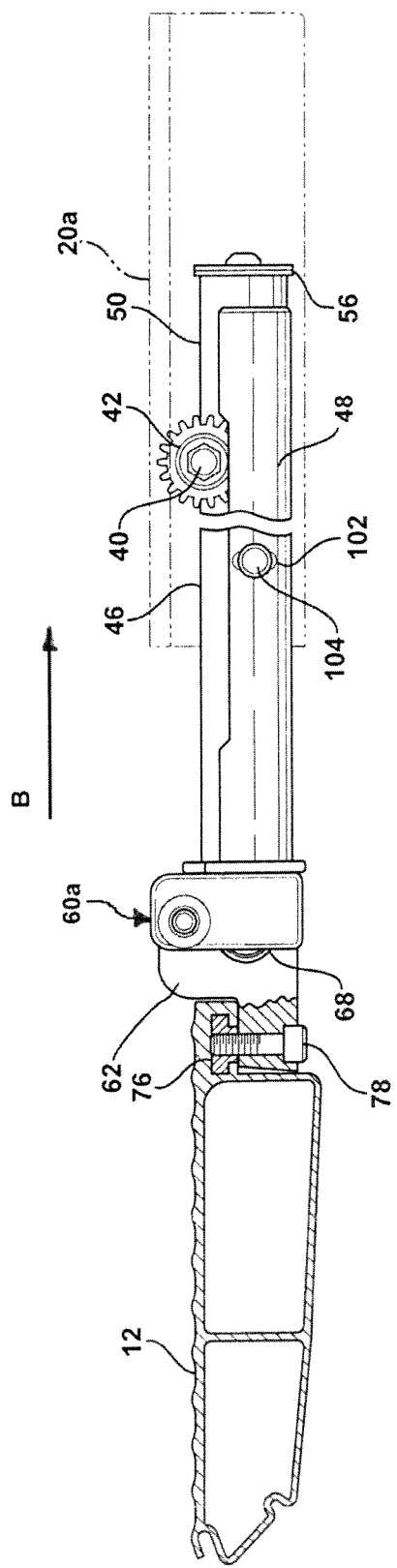
FIG. 11 is an end view of the running board assembly including the step in a deployed position.

In operation, starting with the step 12 in the stowed position (as shown in FIG. 10), the motor assembly 32 is actuated to rotate the first drive shaft 34 in a first direction. The rotation of the first drive shaft 34 causes rotation of the deploy gear 42 in the first direction. The engagement between the deploy gear 42 and the linear rack 84 of the deploy shaft 48 causes linear movement of the deploy shaft 48 and the arm 46 in an outboard direction (shown by arrow A in FIG. 10). The pivot assembly 60a pivots relative to the arm 46 such that the step 12 tilts downwards to an orientation generally horizontal relative to the ground. The downward tilting of the step 12 can occur as the step 12 begins its linear movement in the outboard direction or it can occur after the step 12 has completed its linear movement in the outboard direction. Once the step 12 has completed travel in the outboard direction and has tilted downwards to an orientation generally level with the ground, the step 12 is in its deployed position (as shown in FIG. 11).

To return the step 12 to the stowed position, the motor assembly 32 is actuated to rotate the first drive shaft 34 in an opposing second direction. The rotation of the first drive shaft 34 causes rotation of the deploy gear 42 in the second direction. The engagement between the deploy gear 42 and the linear rack 84 of the deploy shaft 48 causes linear movement of the deploy shaft 48 and the arm 46 in an inboard direction (shown by arrow B in FIG. 11). The pivot assembly 60a pivots relative to the arm 46 such that the step 12 tilts upwardly. The upward tilting of the step 12 can occur as the step 12 begins its linear movement in the inboard direction or it can occur after the step 12 has completed its linear movement in the inboard direction. Once the step 12 has completed travel in the inboard direction and has tilted upwards, the step 12 is in its stowed position (as shown in FIG. 10).

Figure 12:
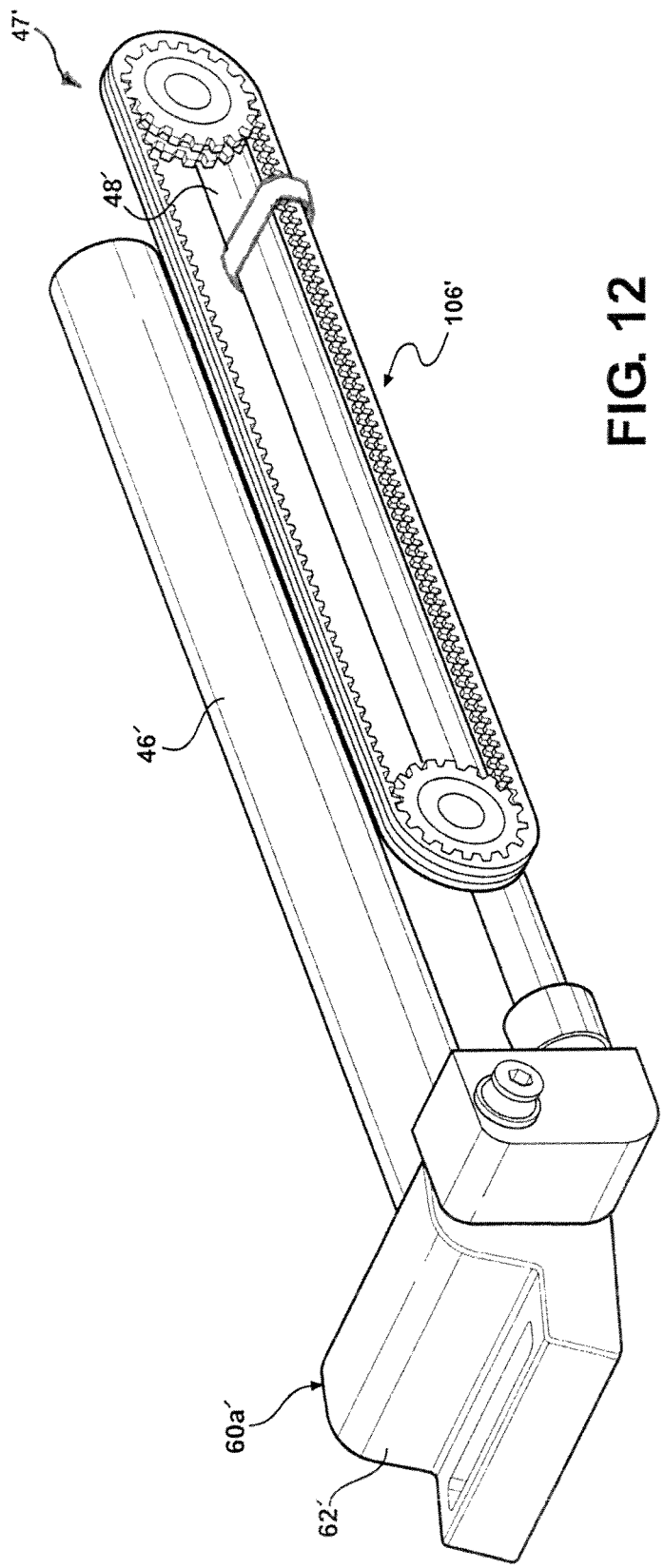
FIG. 12 is a perspective view of a running board assembly according to another embodiment including a belt drive.
Figure 13:
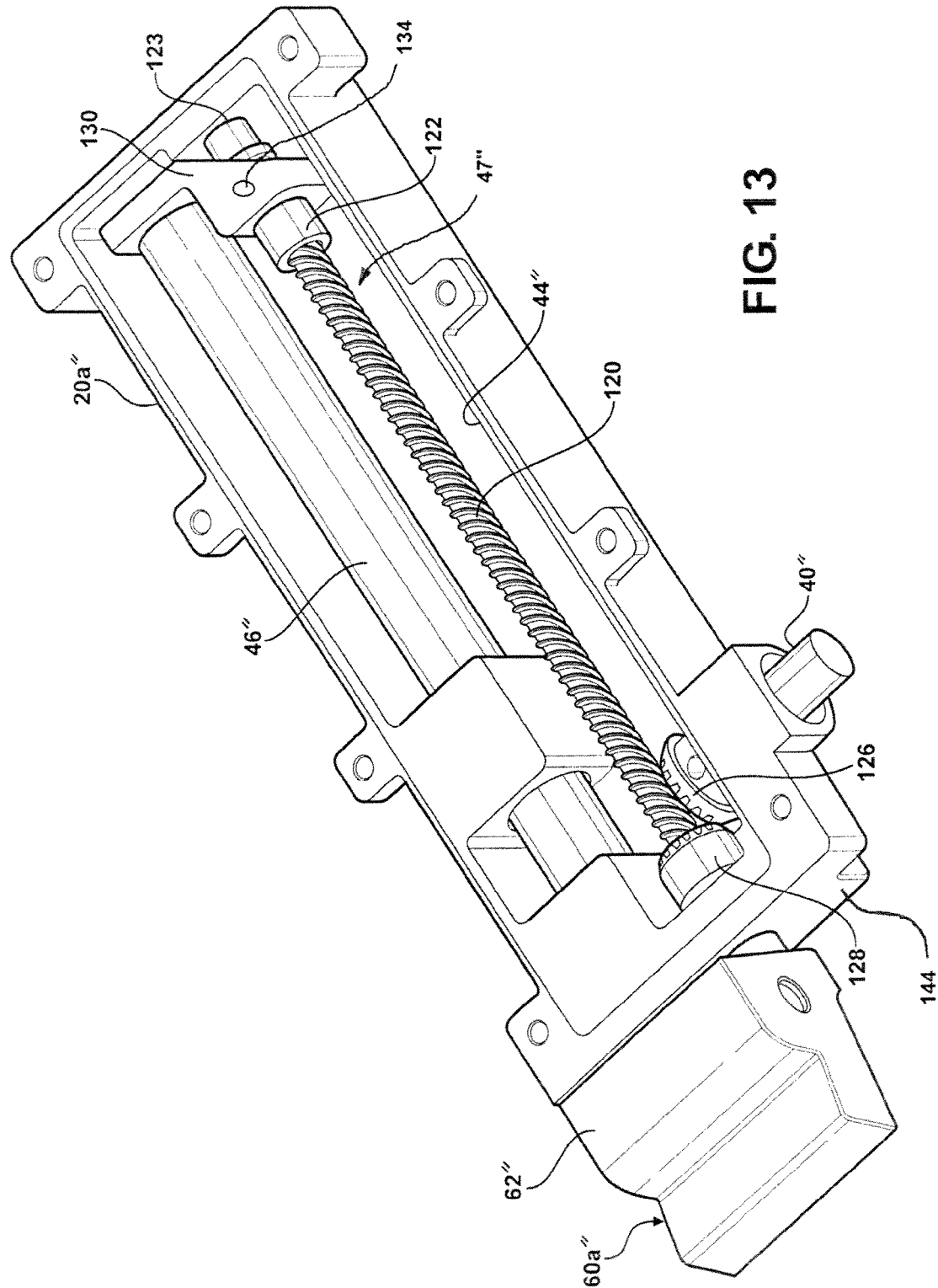
FIG. 13 is a perspective view of the first actuator housing in a running board assembly according to yet another embodiment including a lead screw and a nut disposed therealong.

Referring to FIG. 12, wherein like primed reference numerals represent similar elements as those set forth above, the linear mechanism 47' in another embodiment of the running board assembly 10' includes a timing belt, generally shown at 106, positioned within the first actuator housing 20a' to provide linear movement of the deploy shaft 48' in response to rotation of the first drive shaft 34. The timing belt 106 may be coupled to the deploy shaft 48' to provide linear movement of the arm 46'. In the alternative, the timing belt 106 may be directly connected to the arm 46' to effect linear movement thereof, thereby eliminating the need for the deploy shaft 48'.

Referring to FIGS. 13 through 16, wherein double-primed reference numerals represent similar elements as those set forth above, the linear mechanism 47" in another embodiment of the running board assembly 10" includes a lead screw 120 and a nut 122 positioned within the interior portion 44" of the first actuator housing 20a". The lead screw 120 is supported within the interior portion 44" of the first actuator housing 20a" by a pair of bearings 121, 123.

Figure 14:
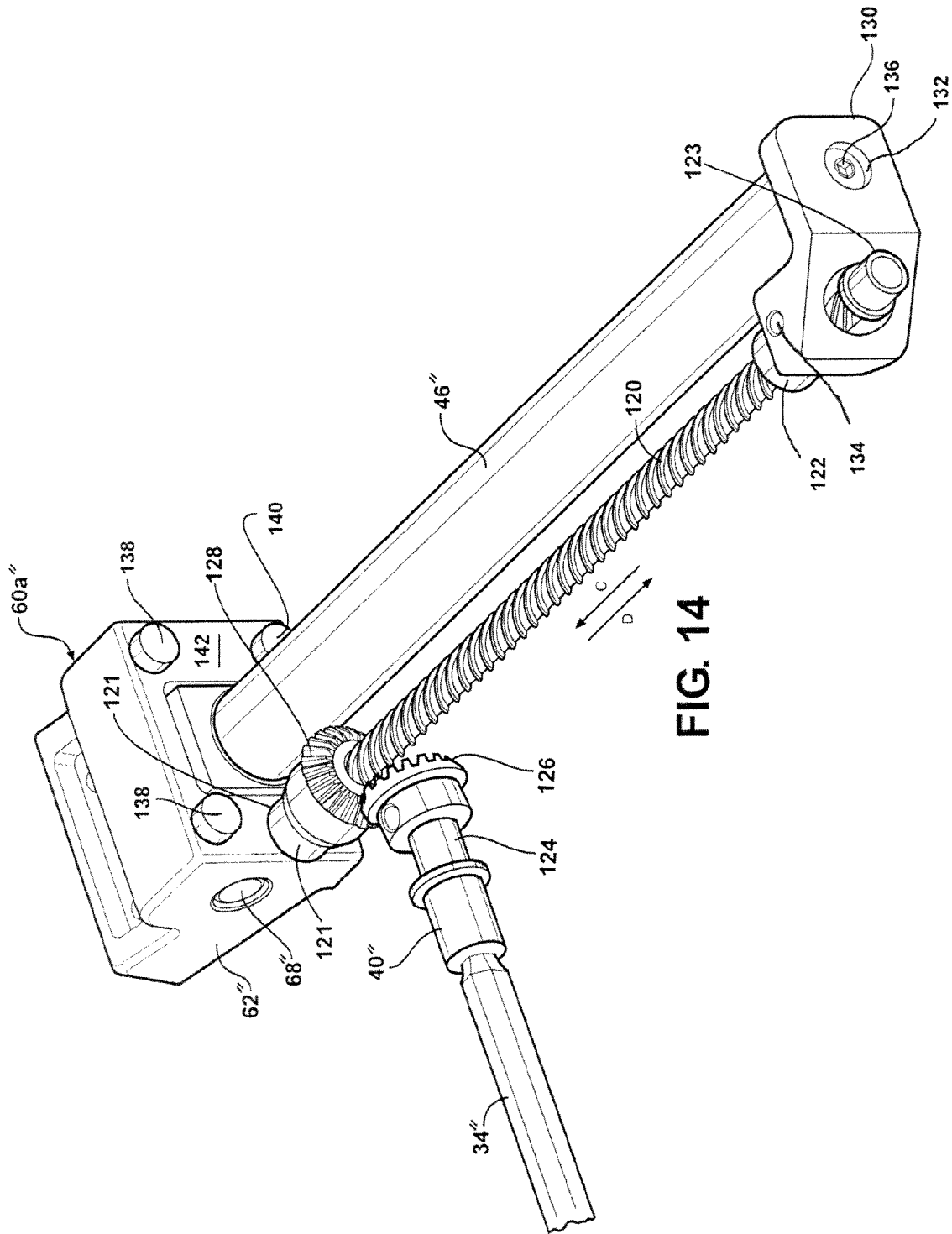
FIG. 14 is a perspective view of the arm and the lead screw coupled to one another by a connecting member.

The first drive shaft 34" is operably coupled to the lead screw 120 to rotate the lead screw 120 relative to the first actuator housing 20a". The first drive shaft 34" is fixedly secured to the shaft 40" which is supported by a bearing 124. The shaft 40" is fixedly secured to a drive mitre gear 126. The drive mitre gear 126 engages a driven mitre gear 128 which is fixedly mounted to the lead screw 120. Thus, the rotation of the first drive shaft 34" rotates the lead screw 120 via the shaft 40", the drive mitre gear 126, and the driven mitre gear 128. The rotation of the lead screw 120 in opposing first and second directions causes linear movement of the nut 122 therealong in the direction of arrows C and D, as shown in FIG. 14.

A connecting member 130 is fixedly secured between the nut 122 and the arm 46". The connecting member 130 defines an aperture 132 for receiving one end of the lead screw 120 therethrough. A first screw 134 is provided to fixedly secure the nut 122 to the connecting member 130. A second screw 136 fixedly secures the connecting member 130 to the arm 46". As a result of the fixed connection between the nut 122 and the arm 46", the linear movement of the nut 122 in the direction of arrows C and D will also move the arm 46" in the direction of arrows C and D.

The pivot assembly 60a" is fixedly secured to the step 12" and is coupled to the protrusion 70" at the outboard end 52" of the arm 46". The pivot assembly 60a" includes the pivot bearing member 62" fixedly mounted along the pivot pin 68". The pivot pin 68" also extends through the protrusion 70" of the arm 46" and is able to rotate relative thereto. Thus, the rotation of the pivot pin 68" will pivot the pivot assembly 60a", and with it the step 12", relative to the arm 46".

Figure 15:
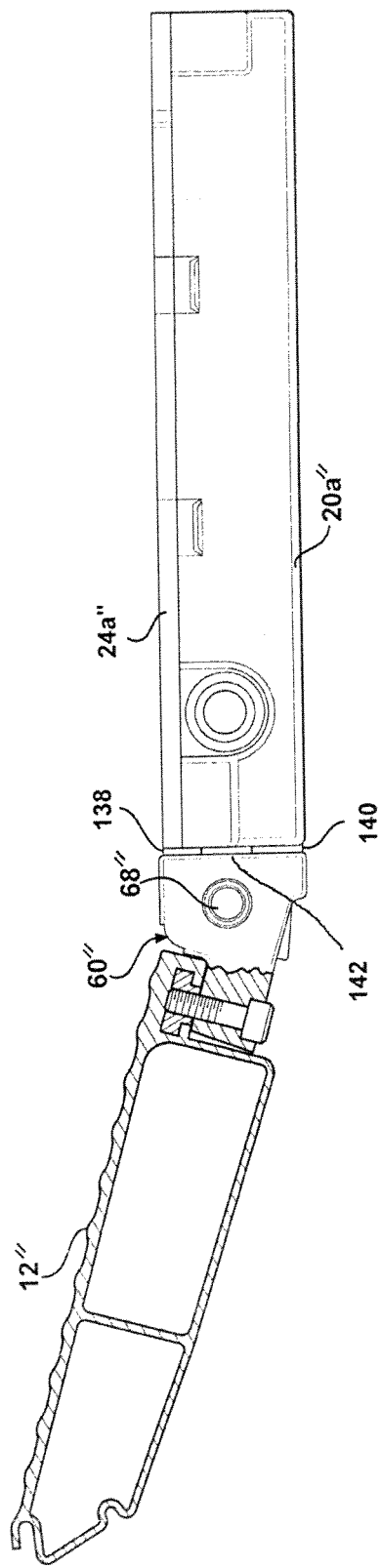
FIG. 15 is an end view of the running board assembly including the step in the stowed position.

The pivot assembly 60a" includes upper 138 and lower 140 bumpers fixedly secured to an inboard surface 142 of the pivot bearing member 62". It is appreciated that the particular number of bumpers 138, 140 may vary. When the step 12" is in the stowed position, the upper 138 and lower 140 bumpers abut against an outer wall 144 of the first actuator housing 20a". The abutting engagement between the upper 138 and lower 140 bumpers and the outer wall 144 of the first actuator housing 20a" maintains the step 12" in the upwardly tilted orientation when the step 12 is in the stowed position, as shown in FIG. 15. When the step 12" is moved to the deployed position, the upper 138 and lower 140 bumpers are not being tilted upwardly by the outer wall 144 and gravity lowers the step 12" to an orientation generally level with the ground, as shown in FIG. 16.

In operation, starting with the step 12" in the stowed position (as shown in FIG. 15), the motor assembly 32" is actuated to cause rotation of the first drive shaft 34" in a first direction. The rotation of the first drive shaft 34" causes rotation of the lead screw 120 in a first direction via the shaft 40", the drive mitre gear 126, and the driven mitre gear 128. As the lead screw 120 rotates, the nut 122 moves along the lead screw 120 in the direction of arrow C in FIG. 14. Because the arm 46" is fixedly secured to the nut 122 by the connecting member 130, the arm 46" will also move out of the first actuator housing 20a" in the direction of arrow C. As the arm 46" moves in the direction of arrow C, the upper 138 and lower 140 bumpers along the inboard surface 142 of the pivot bearing member 62" move away from the outer wall 144 of the first actuator housing 20a". As a result, gravity causes the pivot assembly 60a", and with it the step 12", to tilt downwardly to an orientation generally level with the ground. The arm 46" will continue to move out of the first actuator housing 20a" until the arm 46" bottoms out against the first actuator housing 20a". At this point, the step 12" is in the deployed position, as shown in FIG. 16.

To move the step 12" from the deployed position to the stowed position, the motor assembly 32" is actuated to cause rotation of the first drive shaft 34" in an opposing second direction. The rotation of the first drive shaft 34" causes rotation of the lead screw 120 in a second direction via the shaft 40", the drive mitre gear 126, and the driven mitre gear 128. As the lead screw 120 rotates, the nut 122 moves along the lead screw 120 in the direction of arrow D in FIG. 14. Because the arm 46" is fixedly secured to the nut 122 by the connecting member 130, the arm 46" will also move in the inboard direction of arrow D. As a result, the arm 46" is urged into the first actuator housing 20a". As the outboard end 52" of the arm 46" enters the first actuator housing 20a", the lower bumpers 140 come into contact with the outer wall 144 of the first actuator housing 20a", which causes the pivot assembly 60a", and with it the step 12", to begin to tilt upwardly. The outboard end 52" of the arm 46" continues to move into the first actuator housing 20a" until the upper bumpers 138 come into contact with the outer wall 144 of the first actuator housing 20a", which further tilts the step 12" upwardly. Once all of the upper 138 and lower 140 bumpers abut the outer wall 144 of the first actuator housing 20a", the step 12" is in the stowed position, as shown in FIG. 15.

It is further appreciated that any of a number of mechanisms may be utilized to provide linear movement of a shaft including, but not limited to, a tape drive, a bell crank and tie rod, various belt drives such as a smooth belt, a toothed belt, or cable and the like.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A running board assembly for a motor vehicle, said running board assembly comprising:
   a step;
   a pivot assembly fixedly secured to said step, said pivot assembly including a pivot bearing member and a tilt knuckle pivotally coupled to said pivot bearing member;
   an actuator housing adapted to be fixedly mounted to the motor vehicle, said actuator housing defining an interior portion extending longitudinally between first and second ends and closed by a cover member;
   an elongated arm extending longitudinally between a first end pivotally coupled to said pivot bearing member and an opposite second distal end, wherein said arm is disposed within said interior portion of said actuator housing and slidable relative to said actuator housing in opposing outboard and inboard directions for movement into and out of said actuator housing; and
   a linear mechanism extending longitudinally between a first end fixedly secured to said tilt knuckle and an opposite second distal end, wherein said linear mechanism is disposed within said interior portion of said actuator housing and spaced adjacent from and parallel to said arm in a lateral direction, said linear mechanism coupled directly to said tilt knuckle of said pivot assembly and movable in said opposing outboard and inboard directions to pivot said pivot bearing member and tilt said step relative to said arm and to provide linear movement of said arm in said outboard and inboard directions, thereby moving said step between a stowed position retracted against said actuator housing and a deployed position extended away from said actuator housing.

2. A running board assembly as set forth in claim 1 including a motor assembly operably coupled to said linear mechanism for driving said linear mechanism in said opposing outboard and inboard directions.

3. A running board assembly as set forth in claim 2 wherein said linear mechanism includes a deploy shaft extending between said first and second ends thereof, a timing belt coupled to said deploy shaft and a deploy gear operably connected to said motor assembly and engaging said timing belt to provide linear movement of said deploy shaft in said opposing outboard and inboard directions in response to rotational movement of said deploy gear.

4. A running board assembly as set forth in claim 2 wherein said linear mechanism includes a deploy shaft extending between said first and second ends thereof and having a linear rack extending longitudinally therealong.

5. A running board assembly as set forth in claim 4 wherein said linear mechanism includes a deploy gear operably connected to said motor assembly and engaging said linear rack to provide linear movement of said deploy shaft in said opposing outboard and inboard directions in response to rotational movement of said deploy gear.

6. A running board assembly as set forth in claim 5 including a ball selectively retained within a detent groove formed along said deploy shaft.

7. A running board assembly as set forth in claim 6 including a spring for biasing said ball into said detent groove.

8. A running board assembly as set forth in claim 1 including a friction member disposed between said actuator housing and said arm for controlling said tilt of said step relative to said arm during linear movement of said arm in said opposing outboard and inboard directions.

9. A running board assembly for a motor vehicle, said running board assembly comprising:
   an actuator housing adapted to be fixedly mounted to the motor vehicle, said actuator housing including an outer wall defining an interior portion extending longitudinally between first and second ends;
   a step;
   a pivot assembly fixedly secured to said step, said pivot assembly including an inboard surface having at least one bumper mounted therealong;
   an elongated arm extending longitudinally between a first end coupled to said pivot assembly and an opposite distal end, wherein said arm is disposed within said interior portion of said actuator housing and slidable relative to said actuator housing in opposing outboard and inboard directions for movement into and out of said actuator housing, and wherein said pivot assembly is pivotal relative to said arm to tilt said step relative thereto;
   a lead screw extending longitudinally between a first end operatively coupled to said pivot assembly and an opposite second distal end, wherein said lead screw is disposed within said interior portion of said actuator housing and spaced parallel to said arm, and wherein said lead screw is rotatable in opposing first and second directions; and
   a nut threadedly engaging said lead screw and fixedly connected to said arm such that rotation of said lead screw in said opposing first and second directions moves said arm in said opposing outboard and inboard directions;
   wherein said step is movable between a stowed position in which said at least one bumper abuts said outer wall of said actuator housing to maintain said step outside said actuator housing in an upwardly tilted orientation, and a deployed position in which said at least one bumper is spaced apart from said outer wall of said actuator housing such that said step is tilted to an orientation level with the ground.

10. A running board assembly as set forth in claim 9 including a motor assembly operably coupled to said lead screw for driving said lead screw in said opposing first and second directions.

11. A running board assembly as set forth in claim 10 including a connecting member fixedly securing said nut to said arm.

* * * * *